(12) United States Patent
Ozaki (10) Patent No.: US 8,434,613 B2
(45) Date of Patent: May 7, 2013

(54) CHAIN CONVEYOR SYSTEM

(75) Inventor: Hajime Ozaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 13/406,690

(22) Filed: Feb. 28, 2012

(65) Prior Publication Data

US 2012/0241291 A1   Sep. 27, 2012

(30) Foreign Application Priority Data

Mar. 24, 2011  (JP) ................................ 2011-066432

(51) Int. Cl.
  *B65G 17/06*  (2006.01)
(52) U.S. Cl.
  USPC ....................................... 198/853; 198/690.1
(58) Field of Classification Search ............... 198/690.1, 198/850, 851, 852, 853
  See application file for complete search history.

(56) References Cited

U.S. PATENT DOCUMENTS

| | | | | |
|---|---|---|---|---|
| 4,586,601 A | * | 5/1986 | Hodlewsky | 198/690.1 |
| 5,027,942 A | * | 7/1991 | Wallaart | 198/690.1 |
| 6,705,460 B2 | * | 3/2004 | Weiser et al. | 198/850 |
| 2006/0201790 A1 | * | 9/2006 | Verduijn et al. | 198/852 |
| 2012/0073938 A1 | * | 3/2012 | Ozaki et al. | 198/690.1 |

FOREIGN PATENT DOCUMENTS

| | | |
|---|---|---|
| DE | 9401576 | 8/1994 |
| JP | 09-275011 | 10/1997 |

* cited by examiner

*Primary Examiner* — James R Bidwell
(74) *Attorney, Agent, or Firm* — Dann Dorfman Herrell and Skillman; Henry H. Skillman (57) ABSTRACT

The invention provides a chain conveyor system capable of avoiding damages and vibration noise by securely attracting and retaining metallic magnetic articles in inclined conveyor lines or slippery wet conveyor lines and of providing ready transfer or relay of the articles to other conveyors or equipment also in a conveyor terminal carry-out area. The chain conveyor system comprises a conveyor chain having article-attracting magnet pieces for attracting and retaining articles on loading surfaces thereof and an article-separating device that is disposed coaxially with a sprocket wrapped by and engaging with the conveyor chain and has article-separating magnet pieces that cut the attraction of the article-attracting magnet pieces with the articles on an outer circumferential parts of a free roller.

5 Claims, 7 Drawing Sheets

CHAIN CONVEYOR SYSTEM

CROSS REFERENCE TO RELATED APPLICATIONS

This application claims the foreign priority benefit under Title 35, United States Code, §119 (a)-(d) of Japanese Patent Application No. 2011-066432, filed on Mar. 24, 2011 in the Japan Patent Office, the disclosure of which is herein incorporated by reference in its entirety.

BACKGROUND OF THE INVENTION

1. Field of the Invention

The present invention relates to a chain conveyor system for loading and conveying articles to be conveyed and more specifically to a chain conveyor system for conveying metallic magnetic articles to be conveyed (appropriately referred to simply as articles hereinafter) by securely attracting and retaining the articles even on such a conveyor line inclined upward or downward or on a slippery wet conveyor line.

2. Related Art

Conventionally, there has been known a chain conveyor system for conveying magnetically attractive articles so they do not fall by using a magnet-backed chain having a large number of attractive magnet units disposed at certain intervals on an outer circumferential side of a chain. Surfaces of permanent magnets fixed to thin ferromagnetic yokes of the attractive magnet units are coated by epoxy resin and the like (see Japanese Patent Application Laid-open No. Hei. 9-275011 (Paragraph 8, FIG. 8) for example).

However, because the large number of attractive magnet units is disposed on the outer circumferential side of the chain base in the prior art chain conveyor system using the magnet-backed chain, there have been such problems that not only the attractive magnet units come in contact directly with the metallic magnetic articles, thus displacing or damaging the permanent magnets, but also the chain conveyor system generates noise due to its contact impact.

Still more, because the attractive magnet units continue to be directly in contact with the metallic magnetic articles and to exhibit their strong attractive forces even in a conveyor terminal carry-out area in the prior art chain conveyor system, there has been such a problem that it becomes difficult to separate the articles, posing a serious hindrance in relaying or transferring the articles, due to the strong attractive force of the attractive magnet units in passing the articles to a succeeding conveyor line or other equipment.

SUMMARY OF THE INVENTION

Accordingly, the present invention aims at solving the aforementioned prior art problems by providing a chain conveyor system capable of avoiding damages and vibration noise caused otherwise by impacts by securely attracting and retaining metallic magnetic articles in inclined conveyor lines or slippery wet conveyor lines and of realizing a steady relay or transfer by smoothly carrying out the articles also in a conveyor terminal carry-out area.

In order to solve the aforementioned problems, according to a first aspect of the invention, there is provided a chain conveyor system for conveying magnetically attractive articles by attracting and retaining the articles on a loading surface thereof by magnetism, comprising a conveyor chain, sprockets and a circular article-separating means, the conveyor chain comprising;

a plurality of synthetic resin links having laterally adjoining modules with loading surfaces;

link pins for linking the synthetic resin links with each other in a chain longitudinal direction;

magnet-piece-storing chambers formed within selected synthetic resin link modules; and article-attracting magnet pieces stored in the magnet-piece-storing chambers which are free to move from the inner circumferential side to the outer circumferential side of the chain within the magnet-piece-storing chambers of the selected link modules to attract and retain the article on the loading surfaces;

the sprockets being wrapped by and engaged with the conveyor chain to from the chain into a loop having a conveying run extending between the points where the chain passes from one sprocket and the points where the chain passes into engagement with a second sprocket;

the article-separating means comprising, on outer circumferential parts thereof, article-separating magnet pieces for separating the articles attracted by the synthetic resin link modules by attracting the article-attracting magnet pieces within the magnet-piece-storing chambers formed in the synthetic resin link modules that are wrapped around the article-separating means from the outer circumferential side to the inner circumferential side of the chain within the magnet-piece-storing chambers.

According to a second aspect of the invention, the article-separating magnet pieces of the article-separating means are disposed respectively so as to register with the article-attracting magnet pieces of the synthetic resin link modules.

According to a third aspect of the invention, an attractive force of the article-separating magnet piece to the article-attracting magnet piece is greater than an attractive force of the article-attracting magnet piece to the article.

According to a fourth aspect of the invention, the article-separating means is composed of a free roller coaxially supported through a bearing on a sprocket that is wrapped by and engages with the conveyor chain.

According to a fifth aspect of the invention, the article-attracting magnet pieces extend in the conveyor width direction within the conveyor chain.

Advantageous Effects of the Invention

According to the first aspect of the chain conveyor system of the invention, because the chain conveyor system comprises the conveyor chain having the plurality of synthetic resin links with laterally adjoining modules having the loading surfaces, and link pins for linking the synthetic resin links with each other in the chain longitudinal direction, and because the sprockets that are wrapped by and engage with the conveyor chain, the synthetic resin link modules of the conveyor chain synergistically exhibit attractive force and impact absorbing force and absorb impacts and vibrations of the metallic magnetic articles that are otherwise prone to occur during conveyance of the articles. Therefore, it is possible not only to convey the articles by securely attracting and retaining the articles even on a conveying line inclined upward or downward or on a slippery wet conveyor line but also to avoid damages and vibration noise caused by impacts of the metallic magnetic articles.

Because the conveyor chain further comprises the magnet-piece-storing chambers formed within the synthetic resin link modules and the article-attracting magnet pieces that are stored in the magnet-piece-storing chambers and move from the inner circumferential side to the outer circumferential side of the chain within the magnet-piece-storing chambers to attract and retain the articles on the loading surfaces, and because the article-separating means disposed coaxially with the sprockets comprises, on the outer circumferential parts thereof, the article-separating magnet pieces for separating the articles attracted by the synthetic resin link modules by attracting the article-attracting magnet pieces within the magnet-piece-storing chambers formed in the synthetic resin link modules that are wrapped around the article-separating means, so they are displaced from the outer circumferential side where the article-attracting magnet pieces attract the metallic magnetic articles, to the inner circumferential side position of the chain where the article-separating magnet pieces attract the article-separating magnet pieces within in the magnet-piece-storing chambers. As a result, prior to engagement with the sprocket, the link modules effectively attract the articles, and after engaging the sprocket, the modules allow the articles to separate from the chain. Therefore, the chain conveyor system can smoothly transfer the metallic magnetic articles to a succeeding conveyor line or other equipment in a conveyor terminal carry-out area in which the sprockets having the coaxial article-separating means are disposed without unintentionally continuing to attract the articles, i.e., the system can realize a so-called steady relay or transfer.

According to the second aspect of the chain conveyor system of the invention, because the article-separating magnet pieces of the article-separating means are disposed respectively so as to register with the article-attracting magnet pieces of the synthetic resin link modules and attract each other, it becomes possible to achieve smooth transfer by exhibiting both attractive forces in maximum and steadily when separating the articles without requiring phase shift in the separation timing of the article-separating means.

According to the third aspect of the chain conveyor system of the invention, because the attractive force of the article-separating magnet piece to the article-attracting magnet piece is greater than the attractive force of the article-attracting magnet piece, the attraction between the article-separating magnet piece of the article-separating means and the article-attracting magnet piece of the synthetic resin link module strongly surpasses the attraction between the article-attracting magnet piece and the article. Therefore, it become possible to improve reliability of the relay or transfer by powerfully attracting the article-attracting magnet piece of the synthetic resin link module from the outer circumferential side to the inner circumferential side of the chain within the magnet-piece-storing chamber to interrupt the attraction with the article instantly.

According to the fourth aspect of the chain conveyor system of the invention, because the article-separating means is composed of a free roller coaxially supported through a bearing on the same shaft that supports sprocket that is wrapped by and engages with the conveyor chain, and because the article-separating magnet pieces of the article-separating means and the article-attracting magnet pieces of the synthetic resin link modules attract each other following the engagement of the chain with the sprocket, and pass out of registry upon disengagement of the chain from the sprocket, it becomes possible to reliably attract the articles prior to engagement of the chain with a sprocket and thereafter separate the articles with the movement of the chain around the sprocket.

According to the fifth aspect of the chain conveyor system of the invention, because the article-attracting magnet pieces extend on both sides in the conveyor width direction within the conveyor chain, the article-attracting magnet pieces within the synthetic resin link modules move all together on both sides in the conveyor width direction between the outer circumferential side and the inner circumferential side of the chain within the permanent magnet storing chambers and forcibly attract or separate the articles corresponding to the engagement and disengagement states of the conveyor chain relative to the sprocket. Therefore, the chain conveyor system can smoothly discharge the metallic magnetic articles to a succeeding conveyor line or to other equipment in a conveyor terminal carry-out area in which the sprocket coaxially having the article-separating means is disposed without unintentionally biasing loading orientation of the articles, i.e., can realize a so-called steady relay or transfer while keeping a loading attitude.

BEST MODE FOR CARRYING OUT THE INVENTION

Embodiment

An embodiment of a chain conveyor system 100 of the invention will be explained with reference to FIGS. 1 through 6.

Figure 1:
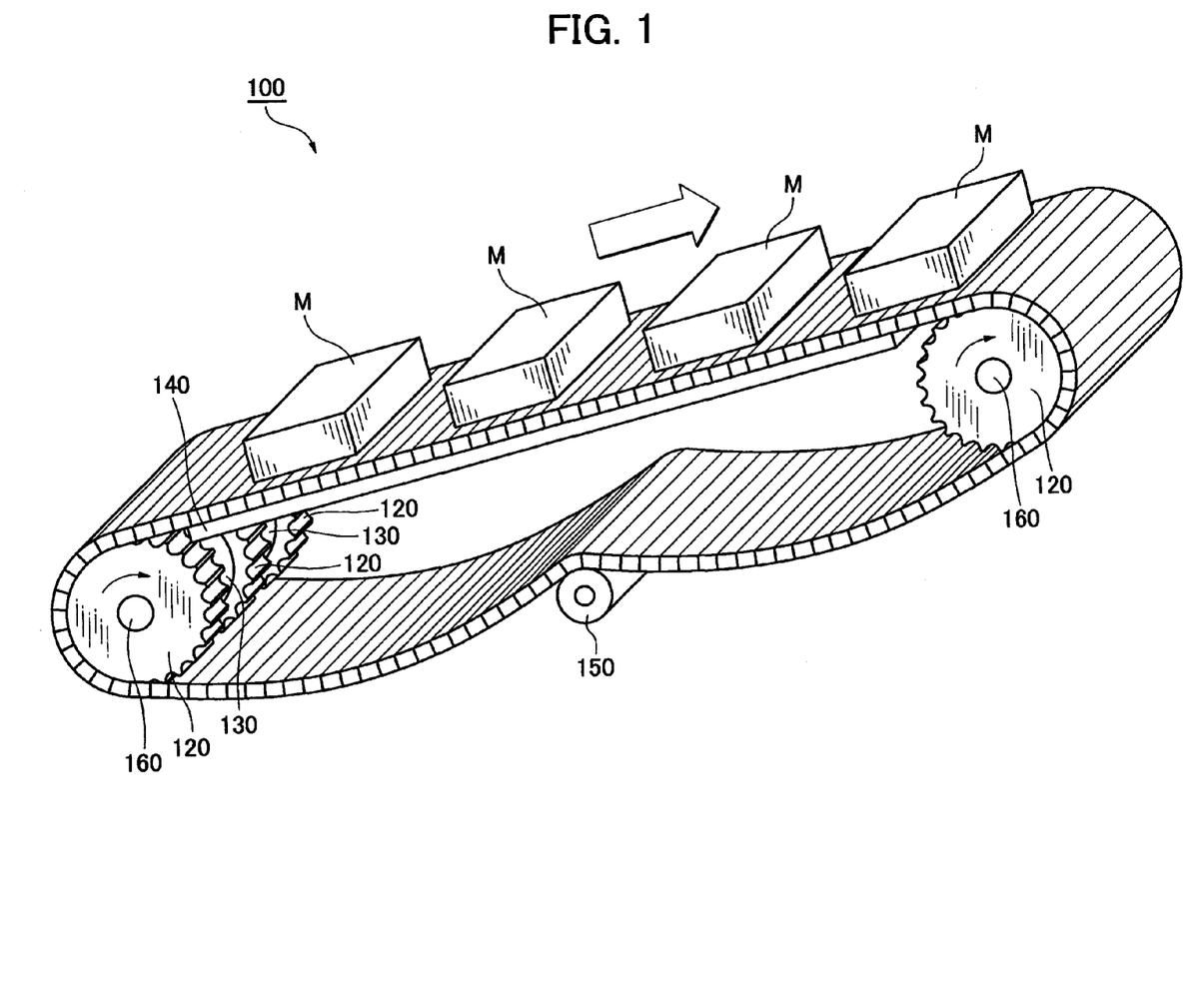
FIG. 1 is a general view showing a mode of use of a chain conveyor system of one embodiment of the invention.

As shown in FIG. 1, the chain conveyor system 100 of the illustrated embodiment of the invention comprises a conveyor chain 110 and sprockets 120 that are wrapped by and engage with the conveyor chain 110 to form a closed loop having a conveying run along the top and a return run on the bottom. The conveyor chain 110 comprises a large number of synthetic resin links 111 and link pins 112 for linking the links with each other in a chain longitudinal direction. Each link comprises three modules 111A, 111B and 111C (see FIGS. 2 and 3). The chain 110 conveys metallic magnetic articles M by attracting and retaining the articles on loading surfaces 111a thereof by magnetism in a conveyor line inclined upward.

Thus, the chain conveyor system 100 conveys the metallic magnetic articles M by securely attracting and retaining the articles while avoiding damage and vibration noise caused by impacts of the articles M by the synthetic resin links 111 of the conveyor chain 110 that synergistically exhibit attractive force and impact absorbing force and absorb impacts and vibrations of the articles M that are otherwise prone to occur during conveyance of the articles.

FIG. 1 also shows an article-separating means 130 for separating the articles M attracted by the synthetic resin links 111 described later, a guide rail 140 for restricting and guiding the conveyance and travel of the conveyor chain 110 in its conveying run, an intermediate idler 150 for suppressing the conveyor chain 110 from slacking in its return run, and a rotary shaft 160 for supporting the sprocket 120 and axially supporting the article-separating means 130. In the embodiment shown in FIG. 1, each sprocket means comprises three sprocket wheels, which are spaced apart axially on the shaft 160, and two article-separation means 130 are mounted on the shaft in the spaces between the sprocket wheels.

Figure 2:
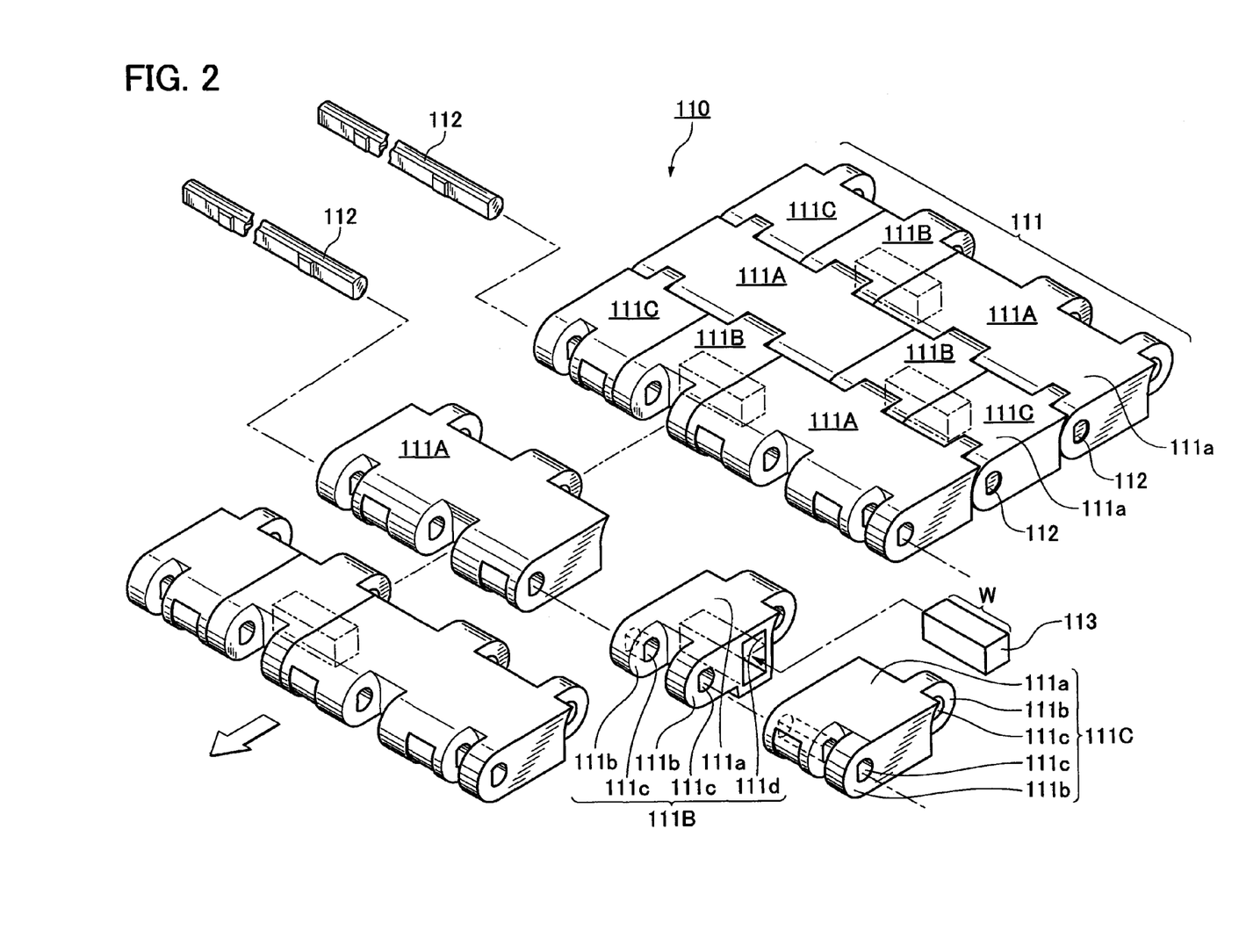
FIG. 2 is an assembly and exploded view of a conveyor chain of the chain conveyor system shown in FIG. 1.
Figure 3:
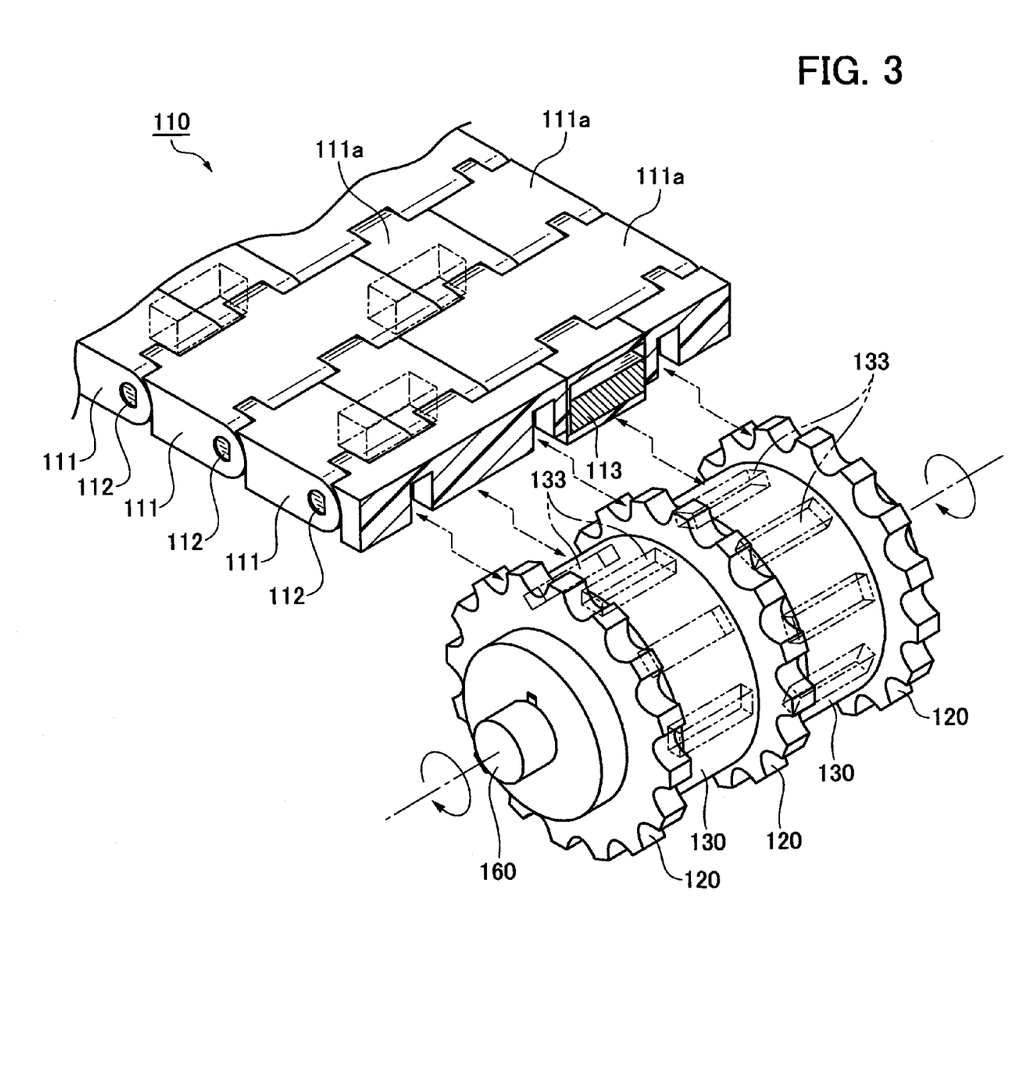
FIG. 3 is a perspective view showing how the conveyor chain and a sprocket are disposed.

As shown in FIGS. 2 and 3, each of the synthetic resin link modules 111A, 111B and 111C has a loading surface 111a for loading the article M, hinge chambers 111b respectively projecting before and after the loading surface 111a and pin inserting holes 111c formed through the respective hinge chambers 111b. The conveyor chain 110 described above is constructed into a predetermined array pattern by linking the links (which comprise three synthetic resin link modules 111A, 111B and 111C) in a conveyor width direction and the large number of three synthetic resin links 111 are linked in a chain longitudinal direction by inserting the link pins 112 through the pin inserting holes 111c. The link pins 112 not only interconnect the links 111, but also interconnect the modules 111A, 111B and 111C to form a single link 111. It should be noted that the width of the link module 111C is more than the combined width of the link modules 111A and 111B, and that the width of each link is equal to the combined width of the modules 111A, 111B and 111C. As shown in FIG. 2, the wide module 111C is positioned alternately on the left and right sides of the links 111, and the module 111B is always positioned between the modules 111A and 111C. The module 111B therefore overlies the one of the two article-separating means on either side of the central sprocket wheel 120.

The three synthetic resin link modules 111A, 111B and 111C are disposed in parallel in the conveyor width direction in the array pattern of the conveyor chain 110 used in the present embodiment. The synthetic resin link modules 111A has a module width wider than twice of the combined width of the synthetic resin link modules 111B and 111C. The synthetic resin link modules 111B and 111C have the equal module width. The array sequence of those synthetic resin link modules 111A, 111B and 111C is switched bilaterally and sequentially in the chain longitudinal direction one after another.

Each synthetic resin link module 111B described above has a magnet-piece-storing chamber 111d therein and the magnet-piece-storing chamber 111d has an article-attracting magnet piece 113 that attracts and retains the article M on the loading surface 111a by moving from a chain inner circumferential side to a chain outer circumferential side within the magnet-piece-storing chamber. As shown in FIG. 2, the piece 113 has a width which extends along the width of the link, and a height which is less than the height of the chamber. Thus, the conveyor chain 110 used in the present embodiment carries the articles M by disposing the synthetic resin link modules 111B having the article-attracting magnet pieces 113 in zigzag in the chain longitudinal direction.

Figure 4:
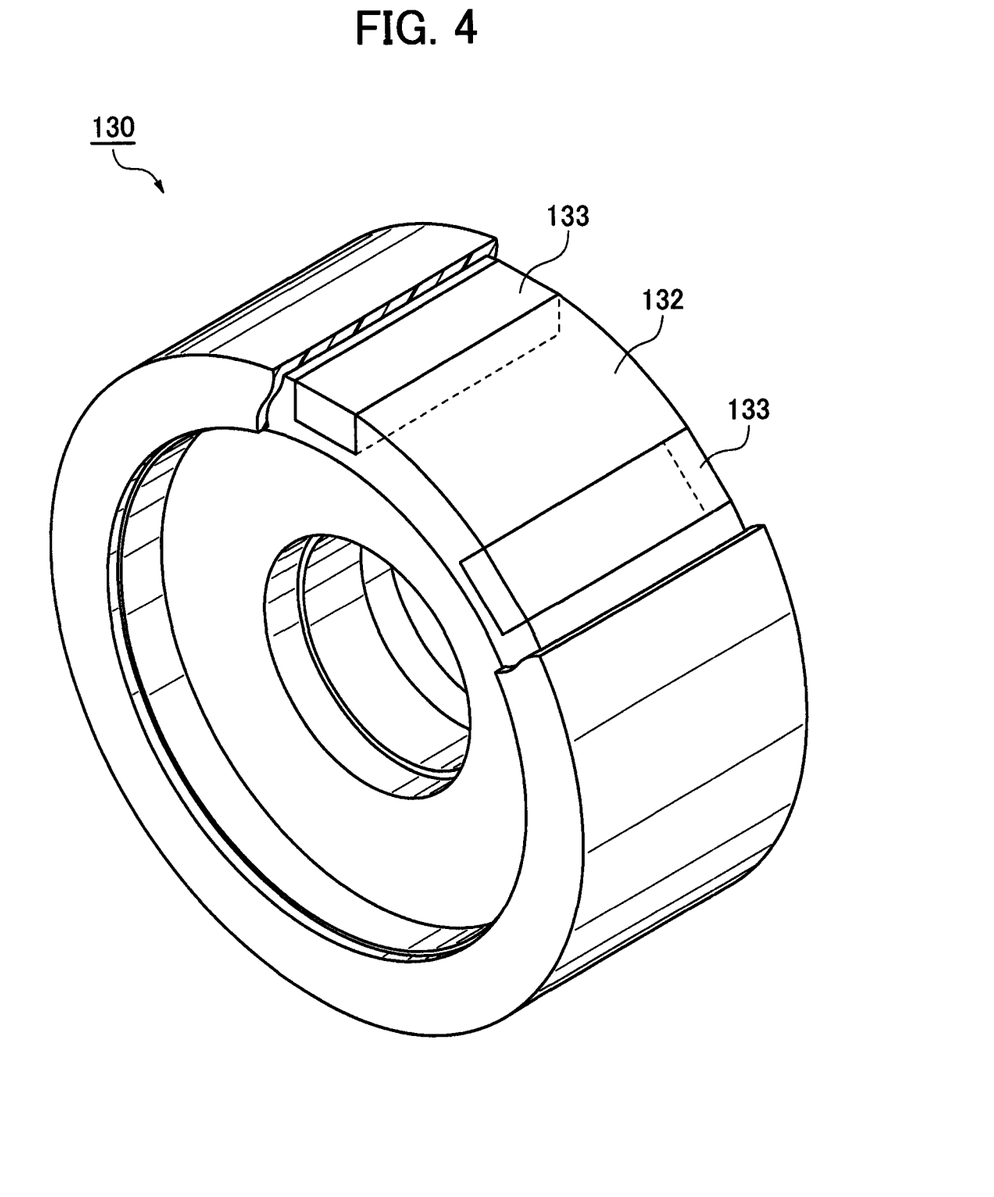
FIG. 4 is a perspective view of an article-separating means shown in FIG. 3.
Figure 5A:
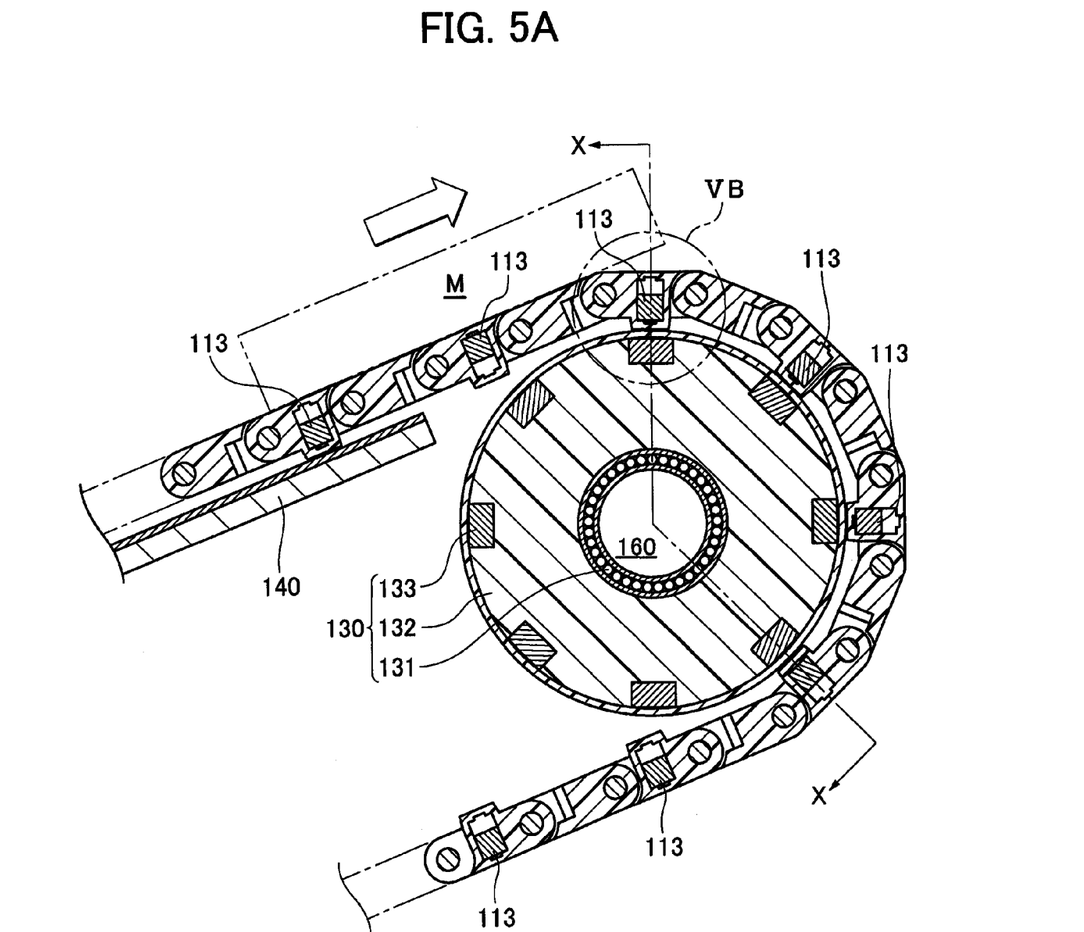
FIG. 5A is an explanatory view explaining operation of the chain conveyor system shown in FIG. 1
Figure 5B:
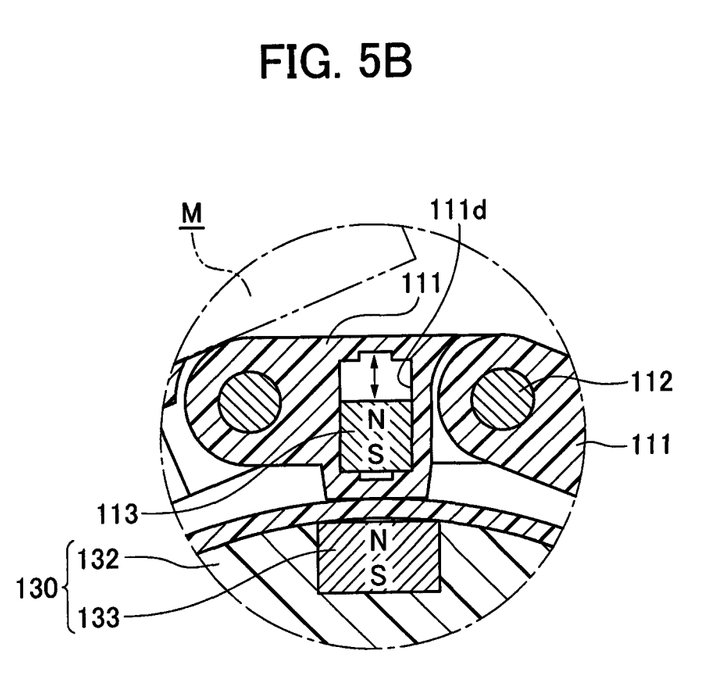
FIG. 5B is an enlarged view of a main part thereof shown in a dot-chain circle in FIG. 5A.

As shown in FIGS. 3 through 5, two sets of the article-separating means 130 for separating the articles M attracted by the synthetic resin link modules 111B described above are disposed coaxially with the rotary shaft 160 fitted and fixed to the sprocket 120 that is wrapped by and engages with the conveyor chain 110. The article-separating means 130 comprises a free roller 132 axially supported through a bearing 131 coaxially supported around the rotary shaft 160 and article-separating magnet pieces 133 disposed at outer circumferential parts of the free roller 132.

Thus, the article-attracting magnet piece 113 provided within the synthetic resin link module 111B is permitted to forcibly either attract or separate the article M by moving between top of the magnet-piece-storing chamber 111d on the outer circumferential side of the chain loop where the magnet piece 113 attracts the metallic magnetic article M and the bottom of the chamber 111d on the inner circumferential side of the chain loop where the magnet piece 113 is attracted to the article-separating magnet piece 133 corresponding to engagement and disengagement states of the conveyor chain 110 and the sprocket 120.

In operation, as shown in FIGS. 5A and 5B, the article-separating magnet pieces 133 of the article-separating means 130 composed of the free roller 132 and the article-attracting magnet pieces 113 of the synthetic resin link modules 111B attract with each other following the engagement and disengagement states of the conveyor chain 110 and the sprocket 120. Thus, the attraction of the magnet pieces 113 with the articles M is cut by attracting the magnet pieces 113 within the magnet-piece-storing chambers 111d of the synthetic resin link modules 111B wrapped around the article-separating means 130 from the chain outer circumferential side to the chain inner circumferential side within the magnet-piece-storing chambers 111d.

Figure 6:
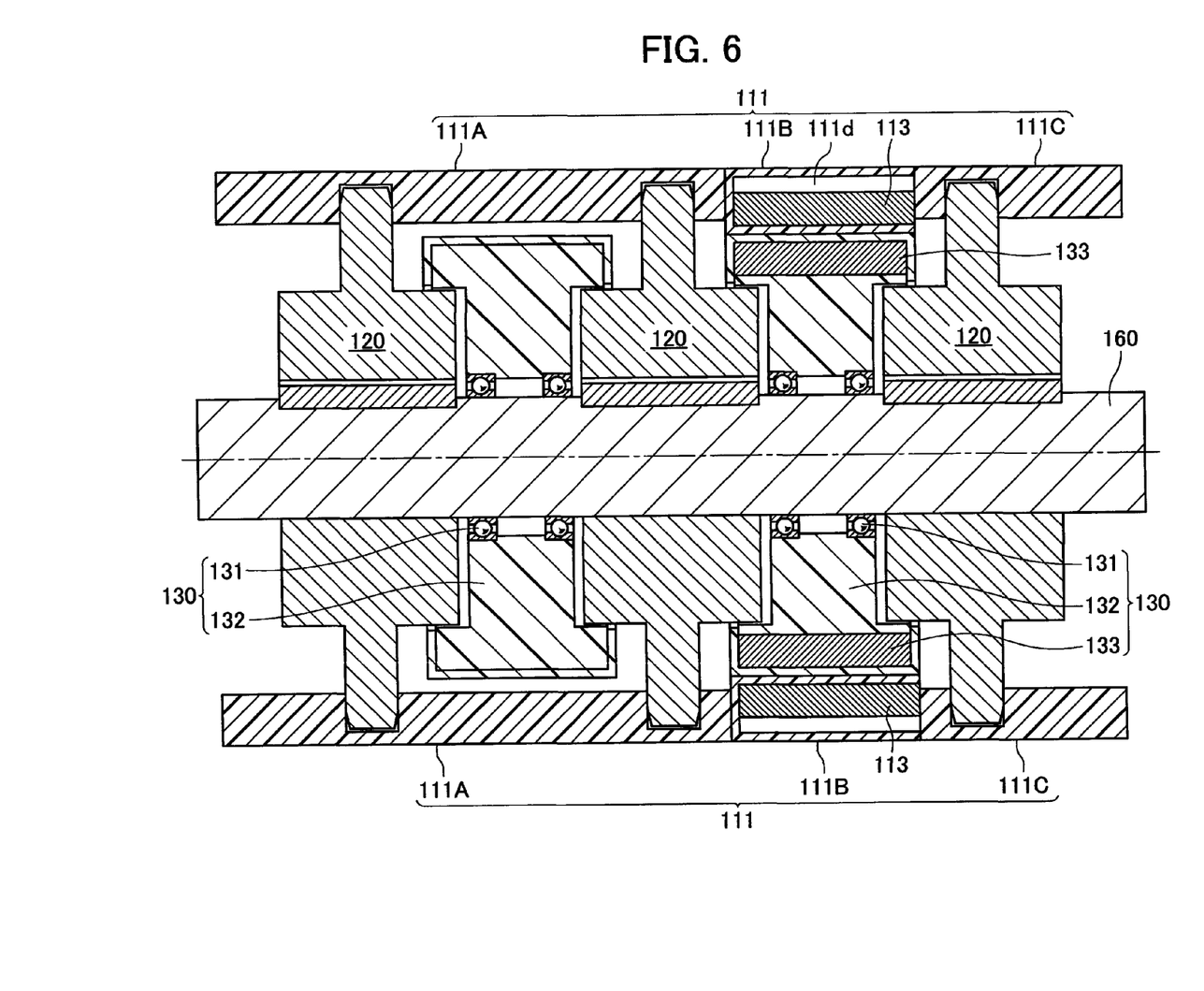
FIG. 6 is a section view explaining the operation of the chain conveyor system taken along a line X-X in FIG. 5.

The article-separating magnet pieces 133 of the article-separating means 130 described above are disposed respectively so as to register with the article-attracting magnet pieces 113 of the synthetic resin link modules 111B as shown in FIG. 6. Thereby, the article-separating magnet pieces 133 of the article-separating means 130 and the article-attracting magnet pieces 113 of the synthetic resin link modules 111B register with each other and attract each other.

The attractive force of the article-separating magnet piece 133 to the article-attracting magnet piece 113 is greater than the attractive force of the article-attracting magnet piece 113 to the article M. Thereby, the attraction between the article-separating magnet piece 133 of the article-separating means 130 and the article-attracting magnet piece 113 of the synthetic resin link module 111B strongly surpasses the attraction between the article-attracting magnet piece 113 and the article M.

As shown in FIG. 2, the article-attracting magnet pieces 113 extend in the conveyor width direction within the conveyor chain 110. Thereby, the article-attracting magnet pieces 113 within the synthetic resin links 111 move all together on both sides in the conveyor width direction between the chain outer circumferential side and the inner circumferential side within the permanent magnet storing chambers 111d and forcibly attract or separate the articles M corresponding to the engagement and disengagement states of the conveyor chain 110 and the sprocket 120. As shown in FIGS. 5A and 5B, the height of each piece 113 is less than the height of the chamber 111d, and the pieces 113 are dimensioned to enable them freely move between the article-attracting position at the top of the chamber 111d, and the article-separating position at the bottom of the chamber 111d.

Because the chain conveyor system 100 of the present embodiment thus obtained has the conveyor chain 110 that is assembled by linking the large number of synthetic resin links 111 that attract and retain the articles M on the loading surfaces 111a by the magnetism with each other in the chain longitudinal direction by the link pins 112 and the sprocket 120 that is wrapped by and engages with and the conveyor chain 110, the chain conveyor system 100 can convey the articles M while securely attracting and retaining the articles M in the conveyor line when it is inclined upward and can avoid the damage and vibration noise otherwise caused by the impacts of the metallic magnetic articles M.

Still more, because the synthetic resin link modules 111B composing the conveyor chain 110 have the article-attracting magnet pieces 113 that move from the chain inner circumferential side at the bottom of the chambers 111d to the chain outer circumferential side at the top of the magnet-piece-storing chambers 111d to attract and retain the articles M on the loading surfaces 113 and because the article-separating means 130 for separating the articles M attracted to the synthetic resin link modules 111B has the bearing 131 coaxially disposed with the sprocket 120, the free roller 132 axially supported through the bearing 131 and the article-separating magnet pieces 133 disposed on the outer circumferential parts of the free roller 132 to separate the articles M by attracting the article-attracting magnet pieces 113 in the synthetic resin link modules 111B from the chain outer circumferential side to the chain inner circumferential side within the magnet-piece-storing chambers 111d, the chain conveyor system 100 can smoothly convey out the metallic magnetic articles M to a succeeding conveyor line and others in a conveyor terminal carry-out area in which the sprockets 120 coaxially having the article-separating means 130 are disposed without unintentionally continuing to attract the articles M, i.e., can realize a so-called steady relay or transfer.

Furthermore, because the article-separating magnet pieces 133 of the article-separating means 130 are disposed so as register with the article-attracting magnet pieces 113 of the synthetic resin links 111, and because the attractive force of the article-separating magnet pieces 133 is greater than the attractive force of the article-attracting magnet pieces 113 to the articles M, it becomes possible to achieve the smooth relay by exhibiting the both attractive forces in maximum and steadily in separating the articles without requiring phase shift in the separation timing of the article-separating means 130. It is also possible to improve reliability of the relay operation by powerfully attracting and displacing the article-attracting magnet piece 113 within the synthetic resin link module 111B from the chain outer circumferential side at the top of the chamber 111d, to the chain inner circumferential side at the bottom of the magnet-piece-storing chamber 111d to cut the attraction with the article M instantly. Thus, the advantageous effects of the invention are remarkable.

The specific mode of the chain conveyor system of the present invention may take any mode as long as the has the following features. The chain conveyor system comprises the conveyor chain having the large number of synthetic resin links having the loading surfaces and the link pins for linking the synthetic resin links with each other in the chain longitudinal direction; the sprockets are wrapped by and engage with the conveyor chain; and the article-separating means is disposed coaxially with the sprockets to separate the articles attracted by the synthetic resin links. The conveyor chain further comprises the magnet-piece-storing chambers formed within selected synthetic resin link modules and the article-attracting magnet pieces that are stored in the magnet-piece-storing chambers and move from the chain inner circumferential side to the chain outer circumferential side within the magnet-piece-storing chambers to attract and retain the article on the loading surfaces; and the article-separating means comprising, on the outer circumferential parts thereof, the article-separating magnet pieces for separating the articles attracted by the selected synthetic resin link modules by attracting the article-attracting magnet pieces within the magnet-piece-storing chambers formed in the synthetic resin link modules that are wrapped around the article-separating means from the chain outer circumferential side to the chain inner circumferential side within the magnet-piece-storing chambers. Thereby, the chain conveyor system can convey the articles by securely attracting and retaining the articles even on the conveying line inclined upward or downward or on the slippery wet conveyor line and can avoid damages and vibration noise otherwise caused by impacts. The chain conveyor system can also smoothly relay or transfer the articles in the conveyor terminal carry-out area and can realize a steady relay or transfer.

As for the specific mode of use of the chain conveyor system of the invention, while it is suitably used in the conveyor lines inclined upward or downward where it is required to securely attract and retain the metallic magnetic articles and the slippery and wet conveyor lines where lubricant such as soap water is spread, it is needless to say that it is applicable also to conveyor lines where articles are conveyed horizontally.

Still more, the specific configuration of the conveyor chain used in the chain conveyor system of the invention may be any configuration as long as it comprises the large number of synthetic resin links having the loading surfaces and the link pins for linking the synthetic resin links with each other in the chain longitudinal direction and conveys the metallic magnetic articles by attracting and retaining the articles on the loading surfaces thereof by magnetism. For instance, the conveyor chain may be either one in which the large number of synthetic resin links, each having the loading surface for loading the metallic magnetic article and the hinge chambers projecting before and after the loading surface, are linked in the chain longitudinal direction through the link pins inserted through the pin inserting holes formed in the hinge chambers, or one in which the large number of link rows, each comprising the synthetic resin link modules disposed in the conveyor width direction and each having the loading surface and the hinge chambers before and after the loading surface, is linked in the chain longitudinal direction in a predetermined array pattern through the link pins inserted through the pin inserting holes formed through the hinge chambers.

A specific material of the synthetic resin link module used in the conveyor chain described above may be any material as long as it is synthetic resin that absorbs the impact and vibrations of the metallic magnetic articles and has favorable mechanical properties and molding precision. For instance, any one of polyolefin resin such as polyethylene and polypropylene, polyamide resin, polyester resin, polyacrylic resin, polyacetal resin, polyvinyl chloride resin and polystyrene resin may be used.

The specific configuration of the magnet-piece-storing chamber formed within the synthetic resin link module described above may be any magnet storing space as long as it allows the article-attracting magnet piece for attracting and retaining the articles on the loading surfaces to move from the chain inner circumferential side at the bottom of the chamber to the chain outer circumferential side at the top of the chamber for conveying and to be attracted from the chain outer circumferential side at the top of the chamber to the chain inner circumferential side at the bottom of the magnet-piece-storing chamber. Preferably, when the magnet-piece-storing chamber is a magnet storing space which allows the article-attracting magnet pieces to extend in the conveyor width direction of the conveyor chain, it becomes possible to forcibly attract and separate the articles all together on the both sides of the conveyor width direction.

Still more, the specific configuration of the article-separating means used in the chain conveyor system of the invention may be any configuration as long as it is disposed coaxially with the sprocket and attracts the article-attracting magnet pieces within the magnet-piece-storing chambers provided in the synthetic resin link modules from the chain outer circumferential side to the chain inner circumferential side within the magnet-piece-storing chambers to cut the attraction with the articles. For instance, the article-separating means may be a free roller axially supported through the bearing coaxially with the sprocket wrapped by and engaging with the conveyor chain or may be a rotating body such as a roller fixed coaxially with the sprocket through a key and a key groove. In the case of the free roller described above in particular, the article-separating magnet pieces are provided on the outer circumferential parts thereof. Thereby, the article-separating magnet pieces of the article-separating means and the article-attracting magnet pieces of the synthetic resin link modules attract with each other following the engagement and disengagement states of the conveyor chain and the sprocket and it becomes possible to steadily separate the articles in synchronism with the move of the conveyor chain.

A concrete material of the article-separating magnet piece of the article-separating means and the article-attracting magnet piece of the synthetic resin link module used in the chain conveyor system of the invention may be any permanent magnet such as rare-earth magnet and ferrite magnet as long as it is capable of assuring magnetic force required for attracting and retaining the metallic magnetic articles. Neodymium magnet whose residual magnetic flux density and attractive force are strong and which is weak in temperature change is also adoptable.

The article-separating magnet piece and the article-attracting magnet piece described above may be formed into any configuration such as a rectangular parallelepiped, a bar and a plate as long as the article-attracting magnet pieces are dimensioned to be moved between the top and the bottom of the chambers, and the article-separating magnet pieces may register with the article-attracting magnet pieces.

It is preferable to set the attractive force of the article-separating magnet piece to the article-attracting magnet piece described above to be greater than the attractive force of the article-attracting magnet piece to the articles. It becomes possible to achieve the smooth relay by exhibiting both attractive forces in maximum and steadily in separating the articles without requiring phase shift in the separation timing of the article-separating means 130. It is also possible to improve responsibility of the relaying works by powerfully attracting the article-attracting magnet piece 113 within the synthetic resin link module 111B from the chain outer circumferential side to the chain inner circumferential side within the magnet-piece-storing chamber 111$d$ to cut the attraction with the article M instantly. Thus, the advantageous effects of the invention are remarkable. It is needless to say that the article-separating magnet pieces of the article-separating means and the article-attracting magnet pieces of the synthetic resin link modules used in the chain conveyor system of the invention are disposed so that the south and north poles thereof register with each other.

What is claimed is:

1. A chain conveyor system for conveying magnetically attractive articles by attracting and retaining the articles on a loading surface of a conveyor chain by magnetism, comprising said conveyor chain, sprocket means, and an article-separating means, the conveyor chain being formed in a loop having a conveying run terminating in a curved end trained around said sprocket means;

said conveyor chain comprising;
a plurality of synthetic resin links having laterally adjoining modules with top loading surfaces forming the outer circumference of said loop, and bottom surfaces forming the inner circumferential surface of said loop;
link pins for linking the synthetic resin links with each other in longitudinal direction to complete said loop;
magnet-piece-storing chambers formed within selected synthetic resin link modules having an upper extremity adjacent to said top loading surface and a lower extremity adjacent said bottom surface; and
article-attracting magnet pieces stored in the magnet-piece-storing chambers and having a height less than the distance between said upper and lower extremities, and which may be positioned at the upper extremity of the chamber to attract and retain the article on the loading surfaces, said magnet pieces being dimensioned to move from the upper extremity to the lower extremity of said chamber, i.e., to move from an inner circumferential side to an outer circumferential side of the looped chain within said chambers;
said sprocket means being wrapped by and engaged with the conveyor chain to form said curved end of said loop at the end of the conveying run,
said article-separating means comprising, a member concentric with said sprocket means and including on the outer circumferential parts thereof, article-separating magnet pieces for separating the articles attracted by the synthetic resin link modules by attracting the article-attracting magnet pieces within said magnet-piece-storing chambers in the synthetic resin link modules that are wrapped around the sprocket means from the outer circumferential side to the inner circumferential side of the chain within the magnet-piece-storing chambers.

2. The chain conveyor system according to claim 1, wherein the article-separating magnet pieces of said article-separating means are disposed respectively so as to register with the article-attracting magnet pieces of said synthetic resin link modules.

3. The chain conveyor system according to claim 1, wherein said article-attracting magnet piece has a force attractive to the article, and said article-separating magnet piece has an attractive force to the article-attracting magnet piece greater than said attractive force of said article-attracting magnet piece to the article.

4. The chain conveyor system according to claim 1, wherein said article-separating means is a free roller coaxially supported through a bearing on a sprocket that is wrapped by and engages with said conveyor chain.

5. The chain conveyor system according to claim 1, wherein said article-attracting magnet pieces and said chamber are co-extensive in the width direction within said conveyor chain.

* * * * *